United States Patent [19]
Ralston

[11] Patent Number: 6,128,851
[45] Date of Patent: Oct. 10, 2000

[54] TREE SUPPORT ASSEMBLY

[76] Inventor: Danny J. Ralston, 19965 Hwy. B, Edgerton, Mo. 64444

[21] Appl. No.: 09/072,825

[22] Filed: May 5, 1998

[51] Int. Cl.$^7$ .................................................... A01G 13/00
[52] U.S. Cl. ................................................................ 47/23
[58] Field of Search .................................. 47/23, 24, 20, 47/21, 30, 42, 43

[56] References Cited

U.S. PATENT DOCUMENTS

| | | | |
|---|---|---|---|
| 145,585 | 12/1873 | Neff | 47/23 |
| 223,093 | 12/1879 | Barnhill et al. | 47/23 |
| 383,824 | 5/1888 | Newell et al. | 47/23 |
| 404,757 | 6/1889 | Webber | 47/23 |
| 770,461 | 9/1904 | Haggerty | 47/23 |
| 1,116,961 | 11/1914 | Weixler . | |
| 1,879,813 | 9/1932 | Molitor | 47/23 |
| 2,152,018 | 3/1939 | Barnhart . | |
| 2,171,397 | 8/1939 | Griesbacher . | |
| 2,501,255 | 3/1950 | Bell . | |
| 3,400,503 | 9/1968 | Schaller . | |
| 3,816,959 | 6/1974 | Nalle, Jr. . | |
| 4,711,051 | 12/1987 | Fujimoto | 47/30 |
| 4,845,889 | 7/1989 | Taylor . | |
| 4,922,652 | 5/1990 | Graves . | |
| 5,016,388 | 5/1991 | Burress et al. . | |
| 5,263,278 | 11/1993 | Valenti, Jr. | 47/30 |
| 5,345,711 | 9/1994 | Friesner | 47/24 |
| 5,402,600 | 4/1995 | Tompkins . | |
| 5,513,466 | 5/1996 | Mercier . | |
| 5,581,935 | 12/1996 | Anderson . | |

FOREIGN PATENT DOCUMENTS

| | | | |
|---|---|---|---|
| 0490620 | 6/1992 | European Pat. Off. | 47/23 |
| 431308 | 11/1911 | France | 47/43 |

Primary Examiner—Michael J. Carone
Assistant Examiner—Joanne C. Downs
Attorney, Agent, or Firm—Kenneth L Tolar

[57] ABSTRACT

An assembly for supporting a tree in an upright position includes an elongated tubular collar for receiving a tree branch that is separable into two half-portions allowing a user to easily attach or remove the device. The collar has a plurality of apertures thereon for receiving supplemental support legs to further support the collar when placed around the tree trunk. One or more secondary collars may be placed on top of the first collar to which additional supplemental support legs or tubular arms may be attached for supporting the tree's branches.

4 Claims, 1 Drawing Sheet

TREE SUPPORT ASSEMBLY

BACKGROUND OF THE INVENTION

The present invention relates to a tree support assembly, and more specifically, a device for supporting a young, newly planted tree in an upright position.

DESCRIPTION OF THE PRIOR ART

When a small tree is first planted, the tree is vulnerable to external forces such as animals or the weather. Additionally, young trees need to be supported in a substantially vertical position to assist the tree in growing straight and upright. Typically, a rope, cord or string will be secured to the tree at one end and to a stake or anchor at the other end. However, as the tree grows taller and becomes more top heavy, the rope must be repositioned which is laborious and inconvenient. In addition, the rope or string may only be tied to specific locations along the tree trunk allowing the trunk to bend thereabove or therebetween. Finally, as the tree matures, the tree's branches become heavier and tend to sag. The increased weight of the branches may cause them to break or may cause the tree trunk to bend.

Several devices exist in the prior art designed to support plants, trees and similar items in an upright position. For example, U.S. Pat. No. 2,171,397 issued to Griesbacher relates to a plant protector comprising an anchor plate having a pointed end with an elongated U-shaped wire attached thereto. One or more of the devices may be secured around the periphery of a plant or shrub for protection from animals and the like.

U.S. Pat. No. 5,402,605 issued to Tompkins relates to a tree collar including two arcuate plastic halves integrally hinged on a first side and removably attached on the opposing side for receiving a tree trunk. Loops are secured to opposing sides of the collar for securing a rope thereto. The device does not have an integral support means nor is it extendable.

U.S. Pat. No. 2,152,018 issued to Barnhart relates to a plant support comprising a metal circular strap attached to a stake component which surrounds one or more plants.

U.S. Pat. No. 4,845,889 issued to Taylor relates to a shield comprising two hollow, substantially semi-circular wall sections connected via a hinge for surrounding a tree, plant or the like to protect the tree trunk from a weed trimmer string.

U.S. Pat. No. 5,581,935 issued to Anderson relates to a tree protector comprising a perforated cylinder for surrounding a tree trunk and a ring that rests on the ground surrounding the base of a tree having a plurality of apertures thereon designed to deter cattle from approaching the tree.

U.S. Pat. No. 2,051,255 issued to Bell relates to a tree support comprising a pair of substantially circular clamps surrounding a pair of splinter sections that surround a tree trunk. The clamping members have tripod type support legs attached thereto.

The conventional devices described above have numerous drawbacks. Frequently, a tree must grow significantly until it has sufficient strength to withstand high winds. The height of conventional securing devices cannot be extendable to adequately support intermediate size trees. In addition, as the tree's branches grow outwardly from the trunk, they become heavier and are therefore susceptible to breaking. The heavier tree limbs may also cause the trunk to bend resulting in the problems described above. The present invention overcomes these disadvantages by providing a tree support assembly in which the height may be gradually increased as the tree grows. The device also includes removable arms diverging from the support legs to support the tree's branches thereon.

SUMMARY OF THE INVENTION

The present invention relates to a tree supporting assembly for maintaining a small tree in an upright position. The device comprises an elongated primary collar member for surrounding the trunk of a tree. The collar is hollow and tubular formed of two mating portions each having a substantially semi-circular cross-sectional configuration. Integrally depending from an end of the collar are a plurality of legs for supporting the collar a predetermined distance above the ground. On the exterior surface of both mating portions are a plurality of apertures for receiving additional tubular support legs to further stabilize the device. Any number of secondary collars may be contiguously stacked on the top end of the primary collar as the tree grows taller. Each secondary collar includes a pair of separable half-portions similar to the primary collar having a plurality of apertures on their exterior surfaces that removably receive tubular arms on which a tree branch may be supported. It is therefore an object of the present invention to provide a tree support assembly which may be quickly and easily secured around the trunk of a tree.

It is yet another object of the present invention to provide a tree support assembly that is vertically extendable to continue supporting a tree as it grows taller.

It is yet another object of the present invention to provide a tree support assembly having removably attached legs and tree branch support arms. Other objects, features and advantages of the present invention will become readily apparent from the following detailed description of the preferred embodiment when considered with the attached drawings and the appended claims.

DESCRIPTION OF THE PREFERRED EMBODIMENT

Figure 2:
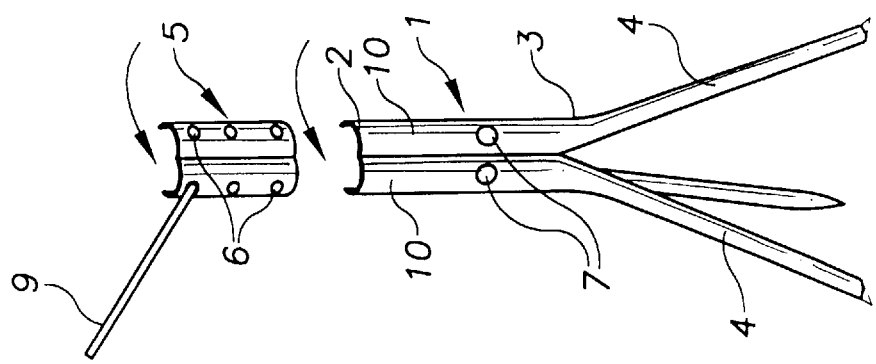
FIG. 2 depicts the inventive device with a secondary collar superimposed thereon.
Figure 1:
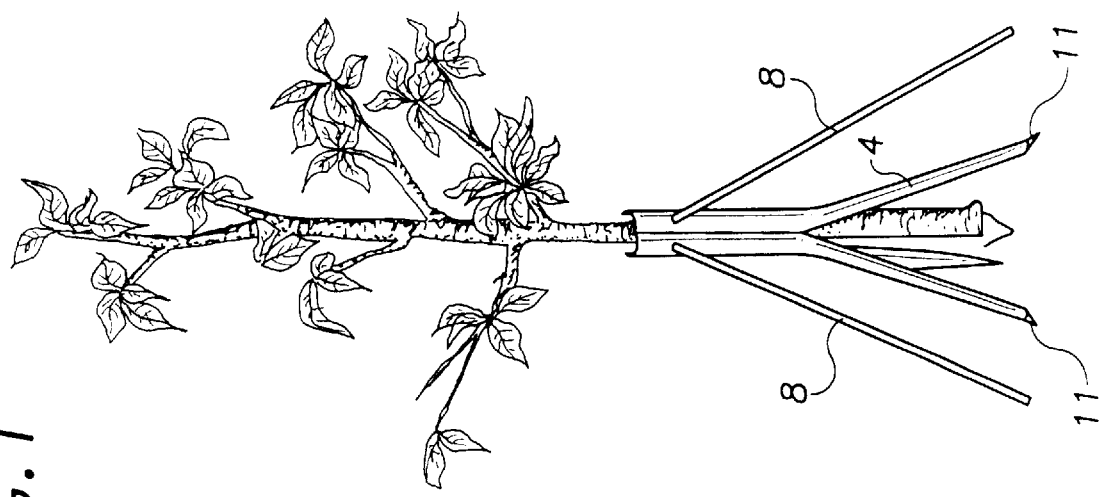
FIG. 1 depicts the inventive device secured to a tree.

Referring now to FIGS. 1 and 2, the present invention relates to an assembly for supporting a tree in an upright position. The device comprises a primary elongated tubular collar 1 having a top end 2 and a bottom end 3 for receiving the trunk portion of a tree. The tubular collar 1 includes two mating, separable half-portions 10 each having a substantially semi-circular cross-sectional configuration. The half-portions each have a pair of opposing longitudinal, vertical edges for selectively mating with the corresponding edges on the opposing half-portion. An edge of one half-portion is hingedly attached to an edge of the second half-portion while the other two edges are removably joined using conventional snap connectors such as tongues and grooves or any other similar means. Accordingly, the collar may be quickly and easily secured around a tree trunk.

Integrally extending from the bottom end of the collar are a plurality of legs 4 for stabilizing and suspending the collar a predetermined distance above a support surface such as the ground. The integral support legs may also be comprised of telescoping, extendable sections allowing the height of the collar to be increased as the tree grows taller. A distal end 11 of one or more of the support legs may be pointed to anchor the device to the ground. On the exterior surface of each of the two mating half-portions of the collar are a plurality of apertures 7 for removably receiving supplementary support legs 8 for further stabilizing the device if necessary. The apertures are preferably tapered such that when the supplementary legs are placed therein, they extend substantially parallel to the integral support legs.

A supplementary collar 5 is also provided, one or more of which may be contiguously stacked on the top end of the primary collar. Each supplementary collar includes two mating half-portions similar to the first collar. The supplementary collar 5 also has a plurality of apertures 6 on its exterior surface for removably receiving tubular arms 9 which provide support for the tree's branches. The apertures 6 are tapered and dimensioned such that the tubular arms diverge from the support legs to assume an orientation similar to the tree branches. Each secondary collar may also have a plurality of apertures tapered opposite to those that receive the arms for receiving additional support legs to further stabilize the tree and the surrounding secondary collar.

The collar, its integral support legs and supplementary collar are preferably constructed with plastic or a similar lightweight material while the removable arm and leg supports are preferably made with stainless steel or a similar rust resistant material. The removable arms and legs may be removably attached to the collars using other conventional attachment means such as screws, bolts, tongues and grooves, etc. However, as will be readily apparent to those skilled in the art, the size, shape and materials of construction of the various components may be varied without departing from the spirit of the present invention.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A tree support assembly comprising:

an elongated tubular collar having a top end and a bottom end, said collar dimensioned to receive and surround a tree trunk, said collar including two mating half-portions each having a pair of opposing, longitudinal vertical edges with an edge of one of said half-portions hingedly attached to an edge of the other half-portion, with the remaining edges being removably joined to selectively receive a tree trunk therebetween;

a plurality of support legs integrally extending from the bottom end of said collar for suspending said collar a predetermined distance above the ground;

a plurality of supplementary support legs removably attached to said collar;

a secondary collar including two half-portions, each half portion of said secondary collar having a pair of opposing longitudinal vertical edges with an edge of one of said half-portions hingedly attached to an edge of the other half-portion, with the remaining edges removably joined to selectively receive a tree trunk therebetween, said secondary collar superimposable on the top end of the first collar;

a plurality of arms removably attached to said secondary collar, each of said arms diverging from said support legs to support a tree branch thereon.

2. A tree support assembly according to claim 1 wherein said secondary collar further includes a plurality of supplemental support legs removably attached thereto.

3. A tree support assembly according to claim 1 wherein the distal ends of said integral support legs are pointed to allow said support legs to penetrate the ground.

4. A tree support assembly according to claim 1 wherein said integral support legs are each formed of telescoping sections to selectively extend the length of said legs.

* * * * *